Oct. 10, 1950  J. K. BEYNON ET AL  2,525,201
DOOR OPERATED OVEN RACK STRUCTURE
Filed May 23, 1947  3 Sheets-Sheet 1
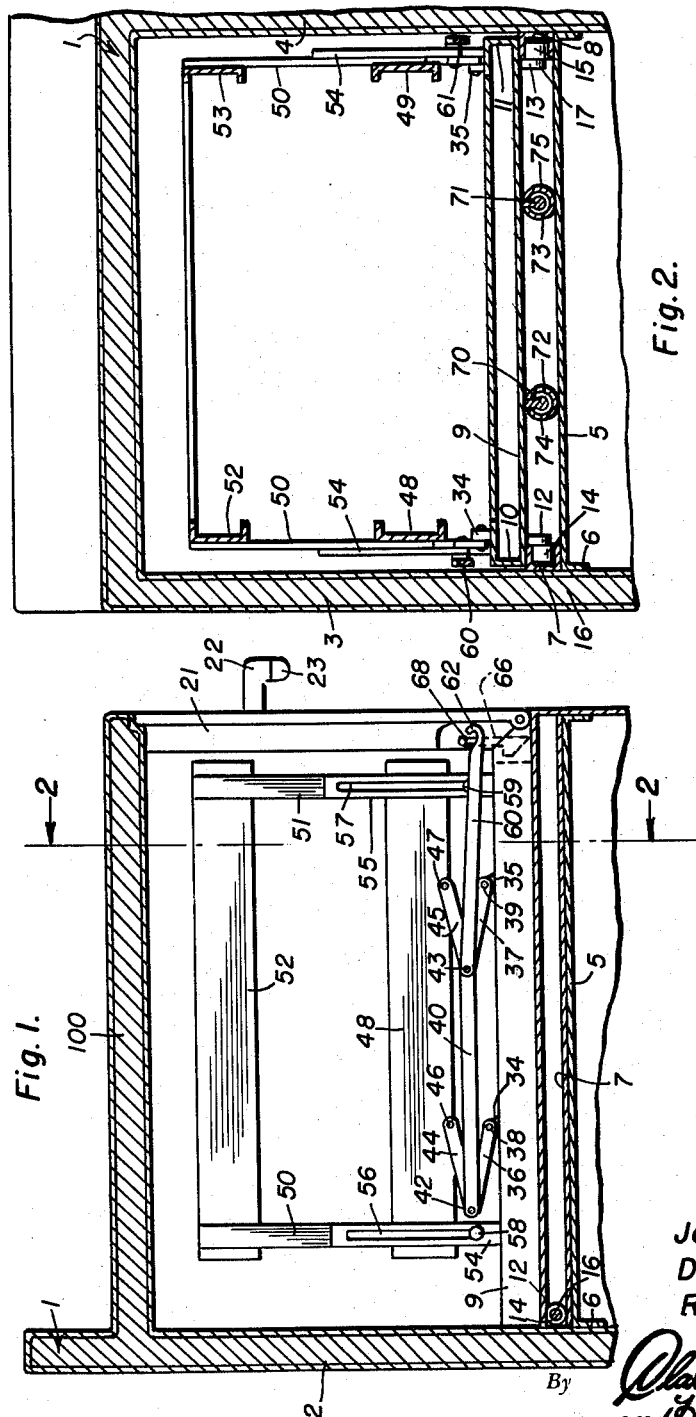
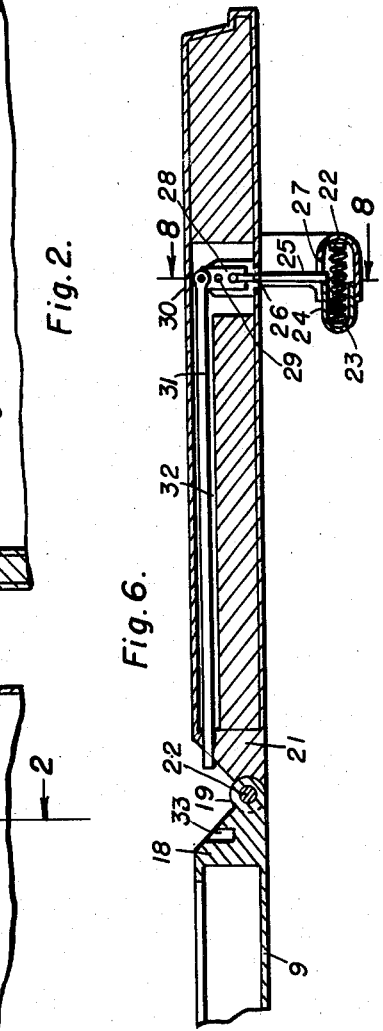
Inventors
John K. Beynon
Donald K. Beynon
Ross L. Beynon
By Clarence A. O'Brien
and Harvey B. Jacobson
Attorneys Oct. 10, 1950     J. K. BEYNON ET AL     2,525,201
DOOR OPERATED OVEN RACK STRUCTURE
Filed May 23, 1947     3 Sheets-Sheet 2
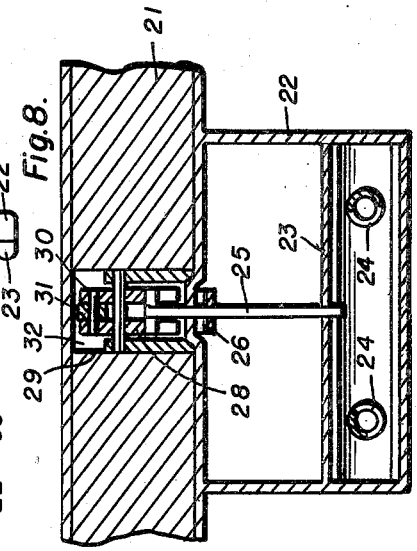
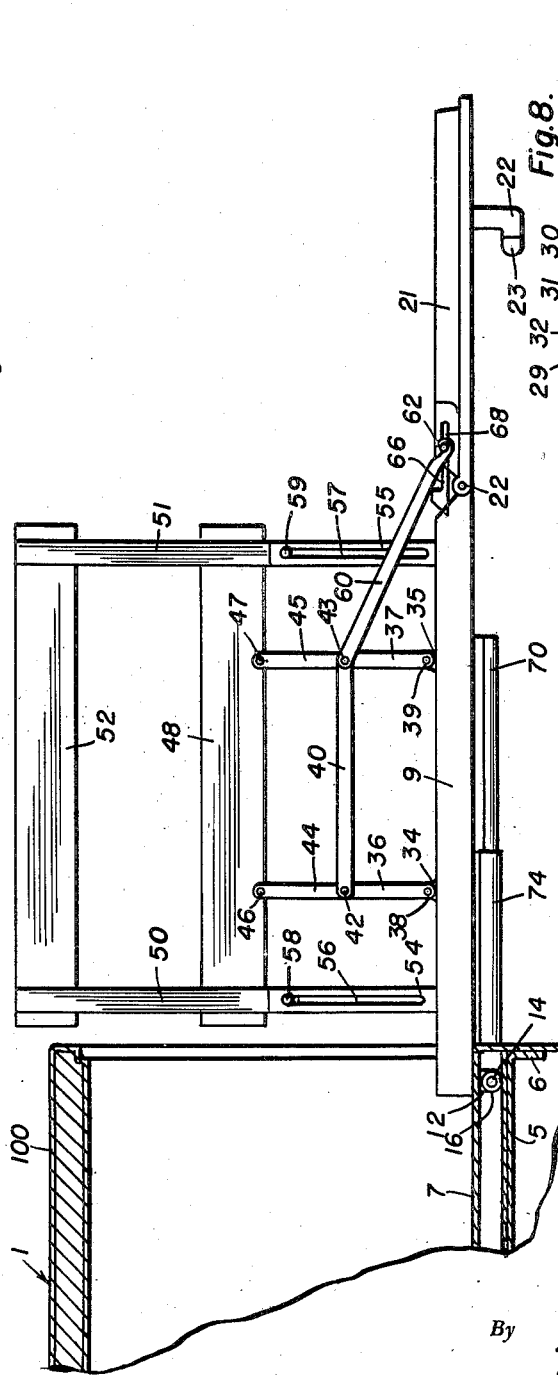
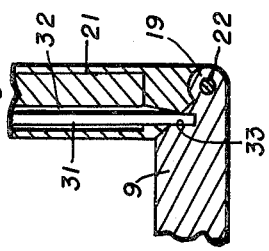
Inventors
John K. Beynon
Donald K. Beynon
Ross L. Beynon
By Clarence A. O'Brien
and Harvey B. Jacobson
Attorneys Oct. 10, 1950     J. K. BEYNON ET AL     2,525,201
DOOR OPERATED OVEN RACK STRUCTURE
Filed May 23, 1947     3 Sheets-Sheet 3
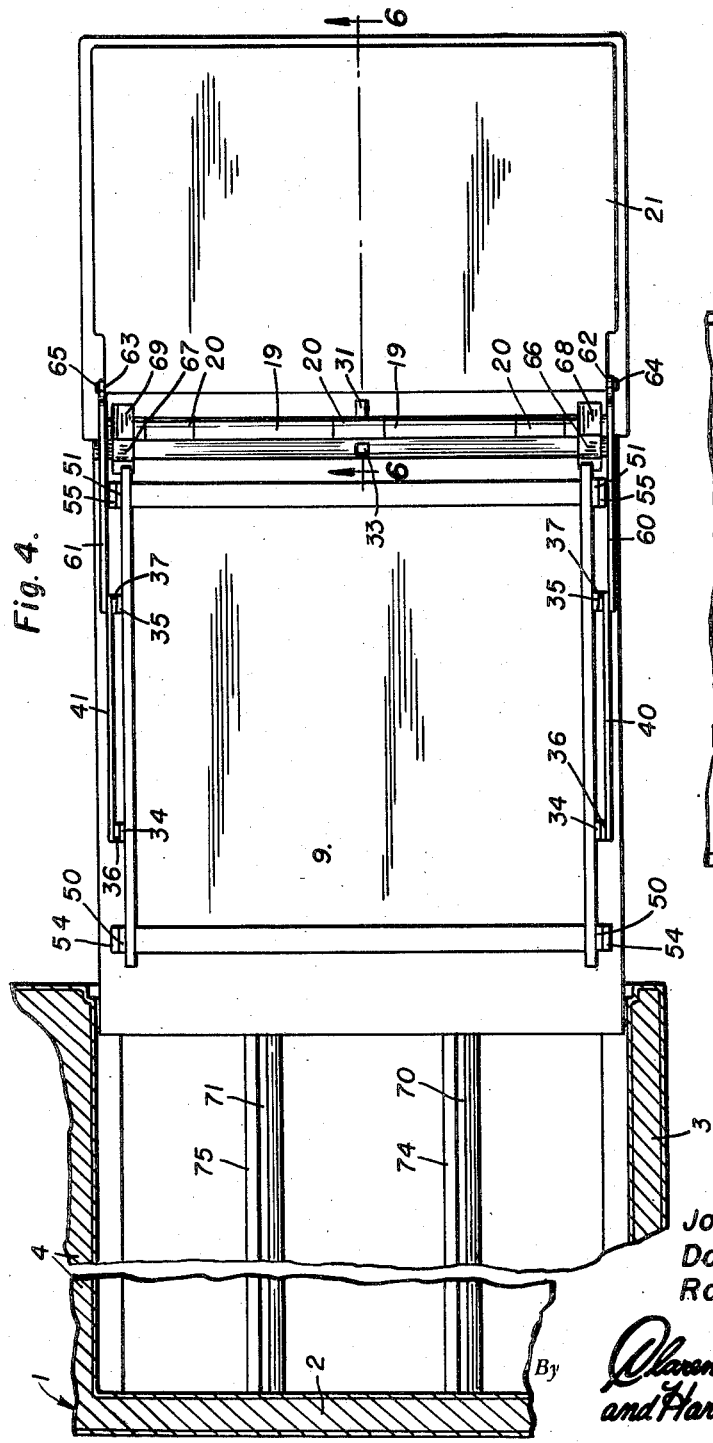
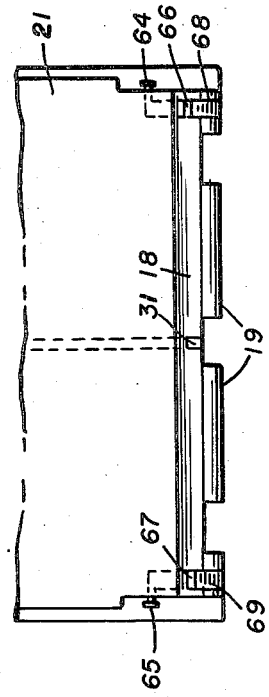
Inventors
John K. Beynon
Donald K. Beynon
Ross L. Beynon
*Clarence A. O'Brien*
*and Harvey B. Jacobson*
*Attorneys*

Patented Oct. 10, 1950

2,525,201

UNITED STATES PATENT OFFICE 2,525,201

DOOR OPERATED OVEN RACK STRUCTURE

John K. Beynon, Donald K. Beynon, and Ross L. Beynon, Chicago, Ill.

Application May 23, 1947, Serial No. 750,152

4 Claims. (Cl. 126—340)

This invention relates to improvements in roll-rise ovens.

An object of the invention is to provide an improved form of baking oven construction for cooking stoves which will provide means for elevating the oven racks or shelves after the same have been withdrawn from the inside of the oven by means of suitable linkage and levers connected to the oven door.

Another object of the invention is to provide an improved rack or shelf construction for baking ovens of cooking stoves, the same being mounted upon rollers and operable in trackways disposed at the opposite sides of the oven, and hingedly connected to the oven door with linkage connected between said oven door and the oven racks or shelves whereby the same may be pulled to a position completely without the oven, and when the oven door is lowered, said racks or shelves will be automatically elevated to facilitate the placing of utensils thereon or for removing utensils therefrom.

A further object of the invention is to provide an automatically operable elevating oven rack or shelf construction which will be automatically raised when the rack or shelf is fully withdrawn from the oven, and which will be automatically lowered immediately prior to the rolling of the rack or tray to a position within the oven and the closing of the oven door.

Another object of the invention is to provide an improved form of roll-rise oven having a rack or shelf operable automatically upon withdrawal from the oven to move to an elevated position, and operable automatically to return to its lowered position with its movement toward its position within the oven, said construction being highly efficient in operation and relatively inexpensive to manufacture and produce.

Other objects will appear as the description proceeds.

In the accompanying drawings which form a part of this application:

Figure 1 is a sectional view through a stove oven showing the improved elevating rack or shelf in side elevation and fully housed within the oven;

Figure 2 is a sectional view taken on the line 2—2 of Figure 1;

Figure 3 is a similar view to Figure 1, but showing the improved racks or shelves fully withdrawn from the oven and in raised or elevated position;

Figure 4 is a plan view looking down upon the improved rack or shelf construction showing the same fully withdrawn from the oven which is shown in section;

Figure 5 is an elevational view of a portion of the inside lower end of the oven door;

Figure 6 is a view taken on the line 6—6 of Figure 4;

Figure 7 is a detail vertical sectional view through the adjacent hinged ends of the oven door and rack or shelf supporting slide showing the latch in secured position, and Figure 8 is an enlarged sectional detail view taken on the line 8—8 of Figure 6.

Like characters of reference are used throughout the following specification and the accompanying drawings to designate corresponding parts.

In carrying out the invention, there is provided a stove baking oven generally designated by the reference numeral 1, having a back wall 2, opposite side walls 3 and 4, and a bottom 5 having integral depending attaching flanges 6 for securing the same in the oven 1.

A pair of oppositely disposed U-shape channel track members 7 and 8 are secured to the opposite side walls of the oven 1, being supported upon the bottom 5 and open on their inner sides.

A U-shape slide member 9 of approximately the same length and width as the oven 1 is formed with inwardly extending longitudinal side channels 10 and 11, and with the depending oppositely disposed ears 12 and 13 upon which the rollers 14 and 15 are rotatably supported on stub shafts 16 and 17 respectively for longitudinal movement in the channel track members 7 and 8. The front end of the slide member 9 is formed with an inwardly extending wall 18 which is provided with the transversely extending spaced hinge barrels 19, which interengage and cooperate with similar alignable hinge barrels 20 formed on the lower edge of the oven door 21. A hinge pintle 22 will be placed through the aligned hinge barrels 19 and 20 to complete the hinge construction for the oven door 21.

The handle for the oven door 21 comprises a fixed upper portion 22 substantially inverted U-shape in cross section, and a lower portion 23 of substantially U-shape in cross section and slidable within said upper portion 22 and normally held in extended position by means of the two parallel coil springs 24 disposed within the handle between said portions 22 and 23. An operating rod 25 is pivoted intermediate its ends on the pivot pin 26 in the oven door 21, with its outer end slidably received through the slot 27 in the fixed handle portion 22 for engagement by the slidable lower handle portion 23, while the inner end of rod 25 is connected to one end of the link 28 which is pivotally mounted upon a bearing pin 29 in the oven door 21. The inner end of the link 28 is pivotally connected at 30 with one end of an elongated latch bar 31 disposed in a channel 32 in the oven door 21. The opposite end of the bar 31 is receivable within the latch receiving well or socket 33 formed in the transverse front wall 18 of the slide member 9 when said door 21 is in closed position.

Spaced upwardly extending supporting ears 34 and 35 are formed upon the opposite sides of the U-shape slide member 9, and pivotally support the links 36 and 37 on the pivot pins 38 and 39. Connecting rods 40 and 41 are pivotally connected to the upper or outer ends of the links 36 and 37 on the pivot pins 42 and 43. Links 44 and 45 are pivotally supported on the pivot pins 42 and 43 at their lower ends, and are pivotally supported upon the laterally extending pivot pins 46 and 47 on the oppositely disposed U-shape slide guides or rack guides 48 and 49.

Vertically extending frame members 50 and 51 are secured to the slide guides 48 and 49, and support the oppositely disposed U-shaped slide guides or rack guides 52 and 53 at their upper ends.

Longitudinally spaced vertical standards or frame members 54 and 55 are fixed to the opposite sides of the slide member 9, and are vertically slotted as at 56 and 57 to slidably receive connecting bolts or pins 58 and 59 which are fixed to and supported by the lower ends of the upper vertical frame members 50 and 51.

Oppositely disposed forwardly extending slide guide elevating and lowering arms 60 and 61 are pivotally supported upon the pivot pins 43, and terminate at their forward ends in hook members 62 and 63. These hook members 62 and 63 are adapted to engage laterally extending headed pins 64 and 65 formed upon the upper ends of weighted latch members 66 and 67. The pins 64 and 65 are slidably disposed in slots 68 and 69 formed in the side edges of the oven door 21 adjacent the hinged end thereof.

A pair of longitudinally extending spaced guide rods 70 and 71 are suitably secured to the under surface of the slide member 9, and loosely and slidably support the slotted tubes 72 and 73 disposed thereabout, which in turn are slidably received within the longitudinally extending spaced concentrically disposed guide tubes 74 and 75 which are suitably fixed to the oven bottom 5. It will thus be understood that when the oven rack or shelves are withdrawn from the oven, they will be supported and guided by the guide rods and guide tubes just described.

From the foregoing description, it will be apparent that the mode of operation of the improved roll-rise oven will be as follows: assuming that the oven door 21 is closed, and that it is desired to withdraw the rack or shelves from the oven 1, the handle 22 will be grasped without compressing the portion 23 thereof, and the slide member 9 with its interconnected parts may then be withdrawn from the oven upon the guide rods 70 and 71, and the telescoping guide tubes 73 and 74, and 75 and 76, said tubes being arranged concentrically about the guide rods 70 and 71. When the slide member 9 is fully on the outside of the oven 1, the handle portion 23 will be compressed towards the handle portion 22, thereby releasing the latch bar 31 from its socket 33. With the latch bar released, the oven door 21 may be lowered from its vertical position to its horizontal position, pivoting upon the hinge pintle 22 connecting the aligned hinge barrels 19 and 20.

As the oven door 21 swings downwardly, the headed pins 64 and 65 will drop downwardly in the slots 68 and 69, the lower ends of the latch members 66 and 67 being released from contact with the sides of the slide member 9, whereupon the hook ends 62 and 63 will engage the pins 64 and 65 straightening out the linkage connected to the slide guides 48 and 49, thereby raising the same to the position shown in Figure 3 of the drawings, in order that food containers may be more readily placed upon and removed from the trays or racks (not shown) supported in said slide guides 48 and 49.

In order to lower the slide guides, the oven door 21 will be raised to its vertical position and automatically latched. The slide member 9 then may be pushed into the interior of the oven 1 and the door 21 closed.

From the foregoing description, it will be apparent that there has been devised and provided a highly efficient form of roll-rise oven which will be relatively inexpensive to manufacture and produce.

While a preferred embodiment of the instant invention has been illustrated and described, it will be understood that it is not intended to limit the scope of the invention thereto, as many minor changes in detail of construction may be restored to without departure from the spirit of the invention.

Having described the invention, what is claimed as new is:

1. In an oven having an open front, a slide member mounted in the oven to move into and out of said oven through the open front thereof, movable slide guides mounted on said slide member to move toward and away from said slide member in parallel relation thereto, a door hinged to the front end of the slide member to move in an arc from an oven front closing position perpendicular to the slide member to an oven front opening position parallel with the slide member, linkage connected to the slide guides and to the door to move the slide guides away from the slide member as the door is moved from its perpendicular position to its parallel position, a latch carried by the door and cooperating with the slide member to retain the door in its perpendicular position, a handle on the door and latch control means on the handle for releasing said latch.

2. In a baking oven having an open front, a slide member mounted in said oven to move into and out of said oven through the open front thereof, a plurality of vertically disposed frame members fixed to and rising from said slide member, a plurality of vertically spaced horizontally disposed rack guides, further frame members joining said rack guides, said first-named frame members having vertical slots therein, pins projecting laterally from said further frame members and slidably received in said vertical slots, a door hinged at its lower edge to said slide member for vertical swinging movement, a group of links terminally pivoted to said rack guides and said slide member, connecting rods joining the links of each group of links, rack guide elevating and lowering arms pivoted to said connecting rods and having terminal hooks, means slidably carried by said door receiving said terminal hooks upon downward swinging movement of the door, a latch carried by the door and cooperating with the slide member to retain the door perpendicular to the slide member, a handle on the door, and latch control means on the handle for releasing the latch.

3. The combination of claim 2 wherein said means slidably carried by said door receiving said terminal hooks includes a plurality of headed pins and weighted latch members carried by said headed pins.

4. In a baking oven having an open front, a slide member mounted in the oven to move into and out of said oven through the open front thereof, vertically movable rack guides mounted on said slide member, a door, hinges securing the door to the front end of said slide member whereby said door is swingable to close the open front of the oven when the slide member is wholly within the oven, and linkage carried by said slide member and connected to said door for raising said rack guides as said door is moved about the hinges to open position, said linkage including links terminally pivoted to said rack guides and to said slide member, rack guide elevating and lowering arms pivoted to said links and having terminal hooks, slidable pins carried by said door, and weighted latch members mounted on said pins for urging said pins into engagement with said terminal hooks upon downward swinging movement of said door about the hinges.

JOHN K. BEYNON.
DONALD K. BEYNON.
ROSS L. BEYNON.

REFERENCES CITED

The following references are of record in the file of this patent:

UNITED STATES PATENTS

| Number | Name | Date |
|---|---|---|
| 1,429,870 | Gussa | Sept. 19, 1922 |
| 1,851,854 | Lindemann et al. | Mar. 29, 1932 |
| 2,028,636 | Wilkinson et al. | Jan. 21, 1936 |
| 2,088,719 | Pierson | Aug. 3, 1937 |
| 2,106,506 | Pletcher et al. | Jan. 25, 1938 |
| 2,204,381 | Reeves | June 11, 1940 |
| 2,224,164 | Sherman et al. | Dec. 10, 1940 |